United States Patent
Heinen et al.

(10) Patent No.: US 10,928,483 B1
(45) Date of Patent: Feb. 23, 2021

(54) LOCALIZATION USING SIGNALS TRANSMITTED OVER DIFFERENT SIGNAL PATHS FOR MOBILE AD HOC NETWORKS

(71) Applicant: Raytheon Company, Waltham, MA (US)

(72) Inventors: Gregory W. Heinen, Tucson, AZ (US); Jeremiah J. Schroder, St. Petersburg, FL (US); James J. Richardson, Temecula, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/525,294

(22) Filed: Jul. 29, 2019

(51) Int. Cl.
*G01S 5/06* (2006.01)
*H04W 64/00* (2009.01)
*G01S 11/02* (2010.01)

(52) U.S. Cl.
CPC ............ *G01S 5/06* (2013.01); *G01S 11/02* (2013.01); *H04W 64/006* (2013.01)

(58) Field of Classification Search
CPC ......... G01S 5/06; G01S 11/02; H04W 64/006
USPC ................... 455/456.1–456.6, 457
See application file for complete search history.

(56) References Cited

U.S. PATENT DOCUMENTS

| | | | |
|---|---|---|---|
| 9,705,561 B2 | 7/2017 | Henry et al. | |
| 9,787,412 B2 | 10/2017 | Henry et al. | |
| 9,793,955 B2 | 10/2017 | Henry et al. | |
| 9,800,327 B2 | 10/2017 | Gerszberg et al. | |
| 9,831,912 B2 | 11/2017 | Henry et al. | |
| 9,860,075 B1 | 1/2018 | Gerszberg et al. | |
| 9,866,309 B2 | 1/2018 | Bennett et al. | |
| 9,876,264 B2 | 1/2018 | Barnickel et al. | |
| 9,893,795 B1 | 2/2018 | Henry et al. | |
| 9,904,535 B2 | 2/2018 | Gross et al. | |
| 9,913,139 B2 | 3/2018 | Gross et al. | |
| 9,935,703 B2 | 4/2018 | Bennett et al. | |
| 9,967,173 B2 | 5/2018 | Gross et al. | |
| 9,973,940 B1 | 5/2018 | Rappaport | |
| 9,999,038 B2 | 6/2018 | Barzegar et al. | |
| 10,020,844 B2 | 7/2018 | Bogdan et al. | |
| 10,027,397 B2 | 7/2018 | Kim | |
| 10,090,594 B2 | 10/2018 | Henry et al. | |
| 10,168,695 B2 | 1/2019 | Barnickel et al. | |
| 10,178,445 B2 | 1/2019 | Lubranski et al. | |
| 10,324,161 B2 * | 6/2019 | Bonawitz | G01S 1/022 |
| 2011/0026363 A1 | 2/2011 | Lavache | |

(Continued)

OTHER PUBLICATIONS

Atherton, "The Army wants drones that make their own networks," Sightline Media Group, Jan. 2019, 4 pages.

(Continued)

*Primary Examiner* — Mong-Thuy T Tran

(57) ABSTRACT

A method includes transmitting a first electromagnetic signal from a first node to a second node through free space. The method also includes transmitting a second electromagnetic signal from the first node to the second node through a communication link, where the communication link physically couples the first and second nodes. The method further includes identifying a distance between the first and second nodes based on a time-difference-of-arrival between reception of the first electromagnetic signal at the second node and reception of the second electromagnetic signal at the second node.

20 Claims, 5 Drawing Sheets

(56) References Cited

U.S. PATENT DOCUMENTS

| | | | | |
|---|---|---|---|---|
| 2012/0078451 | A1* | 3/2012 | Ohtomo | B64C 39/024 701/15 |
| 2014/0160880 | A1 | 6/2014 | King et al. | |
| 2015/0247916 | A1 | 9/2015 | Bartov et al. | |
| 2016/0259032 | A1* | 9/2016 | Hehn | G01S 5/0289 |
| 2017/0023659 | A1* | 1/2017 | Bruemmer | G06K 9/00335 |
| 2017/0069214 | A1* | 3/2017 | Dupray | G08G 5/0021 |
| 2017/0361726 | A1* | 12/2017 | Widmer | A61F 9/00736 |
| 2018/0156616 | A1* | 6/2018 | Bennett | G01S 19/42 |
| 2018/0231634 | A1* | 8/2018 | Bietz | G01S 5/28 |
| 2018/0329433 | A1* | 11/2018 | Zhao | G05D 1/0276 |
| 2019/0181532 | A1* | 6/2019 | Vannucci | H01P 3/13 |
| 2019/0277941 | A1* | 9/2019 | Hehn | G01S 1/20 |

OTHER PUBLICATIONS

"CyPhy Works aims to bring drones to agriculture, mining, public safety sectors," Boston Business Journal, Oct. 2015, 3 pages.
Guillen-Perez et al., "Flying Ad Hoc Networks: A New Domain for Network Communications," Sensors 2018, Sep. 2018, 23 pages.
"Scholar: Ranging & Localization," Humatics, Data Sheet, Mar. 2019, 1 page.
McNeil, "CyPhy Works' new drone takes off on Kickstarter," Directions Media, Jun. 2015, 3 pages.
Nandakumar et al., "3D Localization for Sub-Centimeter Sized Devices," Association for Computing Machinery, SenSys '18, Nov. 2018, 12 pages.
"UWB localization techniques—TOF and TDOA," Nanjing Woxu Wireless Co., Ltd., Apr. 2019, 3 pages.
"Ultra wideband (UWB) wireless Ad hoc networks," Nanjing Woxu Wireless Co., Ltd., Apr. 2019, 3 pages.
"PARC: The Tethered Drone," Aria Insights, Specification Sheet, Version PN15534-01/D, Jan. 2019, 2 pages.
Riley, "A High-Resolution Time Interval Counter Using the TAPR TADD-2 and TICC Modules," Hamilton Technical Services, Mar. 2017, 9 pages.
"PulsON 440 Data Sheet / User Guide," Time Domain, 320-0317D, May 2017, 78 pages.
"PulsON 440 Operation Description / Theory of Operation," Time Domain, Dec. 2015, 9 pages.
"Intelligent Transportation based UWB Positioning and Connectivity," University at Albany—SUNY, Signals & Networks Lab, Apr. 2018, 34 pages.
Yavuz et al., "A new multi-tier adaptive military MANET security protocol using hybrid cryptography and signcryption," Turk J. Elec. Eng. & Comp. Sci., vol. 18, No. 1, 2010, 21 pages.
U.S. Appl. No. 16/525,221 entitled "One-Way Time-of-Flight Localization Using Sonic and Electromagnetic Signals for Mobile Ad Hoc Networks," Jul. 29, 2019, 37 pages.
U.S. Appl. No. 16/525,240 entitled "Localization Using Repeated Transmissions of Electromagnetic Signals for Mobile Ad Hoc Networks," Jul. 29, 2019, 38 pages.
International Search Report and Written Opinion of the International Searching Authority dated May 26, 2020 in connection with International Patent Application No. PCT/US2020/022978, 15 pages.

* cited by examiner

US 10,928,483 B1

LOCALIZATION USING SIGNALS TRANSMITTED OVER DIFFERENT SIGNAL PATHS FOR MOBILE AD HOC NETWORKS

TECHNICAL FIELD

This disclosure generally relates to communication systems. More specifically, this disclosure relates to localization using signals transmitted over different signal paths for mobile ad hoc networks.

BACKGROUND

A mobile ad hoc network or "MANET" generally refers to a communication network in which autonomous nodes communicate wirelessly and are often able to move independently. There is typically no previously-defined infrastructure or architecture for a mobile ad hoc network. As a result, the nodes in the network can often arrange and re-arrange themselves in various ways, and the arrangement of the nodes typically varies over time.

SUMMARY

This disclosure provides localization using signals transmitted over different signal paths for mobile ad hoc networks.

In a first embodiment, a method includes transmitting a first electromagnetic signal from a first node to a second node through free space. The method also includes transmitting a second electromagnetic signal from the first node to the second node through a communication link, where the communication link physically couples the first and second nodes. The method further includes identifying a distance between the first and second nodes based on a time-difference-of-arrival between reception of the first electromagnetic signal at the second node and reception of the second electromagnetic signal at the second node.

In a second embodiment, an apparatus includes a first node having at least one transmitter and at least one processing device. The at least one transmitter is configured to transmit a first electromagnetic signal to a second node through free space and to transmit a second electromagnetic signal to the second node through a communication link physically coupling the first and second nodes. The at least one processing device is configured to identify a distance between the first and second nodes based on a time-difference-of-arrival between reception of the first electromagnetic signal at the second node and reception of the second electromagnetic signal at the second node.

In a third embodiment, a non-transitory computer readable medium contains instructions that when executed cause at least one processing device to receive a time-difference-of-arrival identifying a time between receipt of a first electromagnetic signal transmitted from a first node to a second node through free space and receipt of a second electromagnetic signal transmitted from the first node to the second node through a communication link physically coupling the first and second nodes. The medium also contains instructions that when executed cause the at least one processing device to identify a distance between the first and second nodes based on the time-difference-of-arrival between reception of the first electromagnetic signal at the second node and reception of the second electromagnetic signal at the second node.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
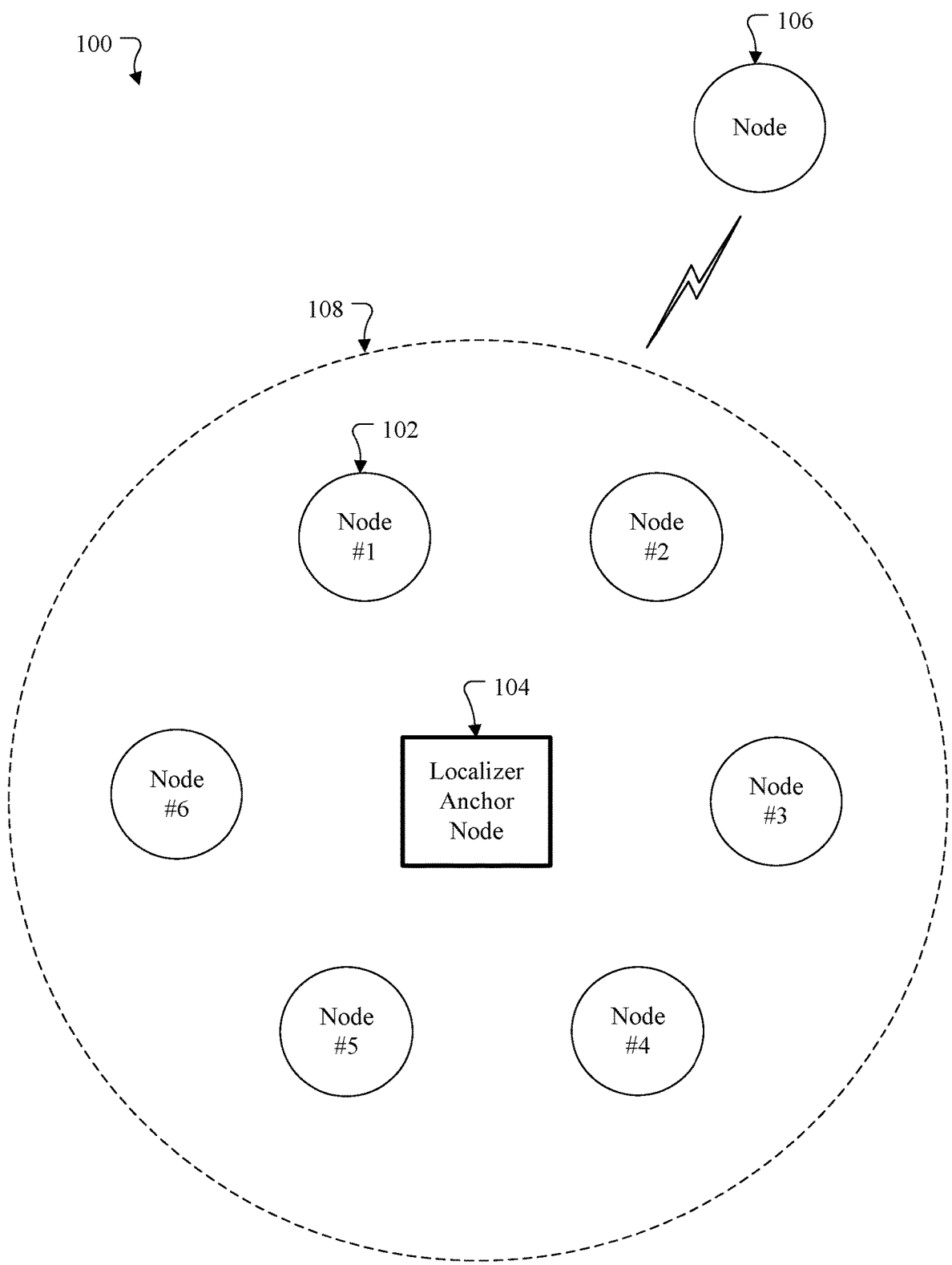
FIG. 1 illustrates an example system supporting localization for mobile ad hoc networks in accordance with this disclosure.

FIGS. 1 through 5, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, a mobile ad hoc network (MANET) refers to a communication network in which autonomous nodes communicate wirelessly and are often able to move independently, so the arrangement of the nodes typically varies over time. In some cases, it may be necessary or desirable to operate the nodes in a mobile ad hoc network as a coherent distributed array, which means that the operations of the nodes are coherently coordinated so that the nodes perform specific operations as a single system. The ability to operate nodes in a mobile ad hoc network coherently can provide various advantages depending on the implementation and application. For example, operating the nodes in a mobile ad hoc network coherently may allow the nodes to collectively create a high-gain synthetic aperture directional antenna.

The formation of a coherent distributed but mobile array of nodes often requires both localization of the nodes and timing synchronization of the nodes. However, these functions can be difficult or costly to perform in various circumstances and for various reasons. For example, two-way time-of-flight techniques are often used in which a signal is transmitted from a first node to a second node, reflected from the second node, and received back at the first node. A distance between the nodes can then be estimated by multiplying the round-trip time of the signal by the speed of the signal and dividing the result by two.

Unfortunately, two-way time-of-flight techniques often use radio frequency (RF) or other electromagnetic signals, and these signals travel at the speed of light (approximately $2.998 \times 10^8$ meters per second) in free space. Identifying the round-trip time of a signal traveling at that speed requires the use of a very precise clock source, such as a clock source having a pico-second accuracy, which can be relatively expensive. The use of less accurate (and cheaper) clock sources may introduce large errors into the calculated distances between the nodes. Also, two-way time-of-flight techniques that rely on reflection of a signal can suffer from problems associated with low reflection area or poor reflection characteristics. Further, two-way time-of-flight techniques that rely on reflection can experience multi-path problems in which a transmitted signal is reflected from multiple objects or from an incorrect object (not just an object of interest), which can cause an erroneous distance to be calculated. In addition, two-way time-of-flight techniques often suffer from $1/r^4$ losses, where r represents the distance between the nodes. This means that an electromagnetic signal rapidly weakens as the distance between the nodes increases, which can limit the range of these techniques.

One overriding problem here is that many ranging systems involve "uncooperative" ranging since one node (often a target) does not voluntarily wish to participate in or cannot participate in ranging operations. For example, RADAR and LIDAR systems are often used for target detection, and the target may not wish to be located or to participate in ranging. As another example, laser range-finders are often used to identify distances to objects, and those objects typically cannot participate in range-finding operations (other than to passively reflect laser energy). As yet another example, sonic robotic sensors are often used to identify nearby walls or other obstacles, and those obstacles typically cannot participate in sensing operations (other than to passively reflect sonic energy).

This disclosure provides various techniques for localization in mobile ad hoc networks. As described in more detail below, nodes are configured to engage in "cooperative" ranging in which two or more nodes cooperate to perform ranging in support of localization and optionally timing synchronization. For example, RF or other electromagnetic signals can be transmitted between a first node and each of one or more second nodes, where the electromagnetic signals are transmitted over different signal paths. In some embodiments, the different signal paths include free space and an optical fiber. A time-difference-of-arrival measurement between receipt of the signals at each second node can be used to identify a distance between the first node and each second node. Also, the first node can trigger each second node to transmit an additional RF or other electromagnetic signal, and additional time-difference-of-arrival measurements between receipt of the trigger signal and receipt of the additional signal at the other second nodes can be used to identify distances between the second nodes.

In these embodiments, the time required for one electromagnetic signal to travel between two nodes may be extremely small and therefore extremely hard to measure accurately. However, it is much easier to identify a time-difference-of arrival between multiple electromagnetic signals, such as when those electromagnetic signals traverse different signal paths and travel through different media (and particularly when the electromagnetic signals travel at different speeds in their respective media).

These approaches allow a distance between two nodes to be calculated without requiring clock synchronization between the nodes, since the time-difference-of-arrival for the electromagnetic signals can be determined using a single clock source at a single one of the nodes. Also, since the time-difference-of-arrival of multiple electromagnetic signals traveling different signal paths (rather than the time-of-flight of a single electromagnetic signal) is used, a less accurate clock source can be used for time-difference-of-arrival measurements, although a higher-accuracy clock source may still be used. Further, at least one electromagnetic signal can be used to help support synchronization or re-synchronization of clock sources used in different nodes, which allows timing synchronization functionality to be incorporated into localization functionality. It should be noted, however, that this feature is optional since one node need not have a synchronized clock (or any clock for that matter) for the localization functionality described here to operate. Moreover, these approaches avoid reliance on signal reflections, helping to avoid low or poor reflection problems, $1/r^4$ losses, and multi-path problems even when nodes are used indoors. In addition, these approaches can obtain accurate position measurements (such as with centimeter or millimeter accuracy) at longer distances, enabling nodes to be arranged in a coherent array and support desired functionality. As a particular example, these techniques may allow nodes in a mobile ad hoc network to be configured to function as a large synthetic aperture antenna for beamforming and to provide fast steering, high gain, and high azimuthal precision.

FIG. 1 illustrates an example system 100 supporting localization for mobile ad hoc networks in accordance with this disclosure. As shown in FIG. 1, the system 100 generally includes various mobile communication nodes 102 and an anchor node 104. Each communication node 102 generally represents a node that can communicate with the anchor node 104 and that can be localized through interactions with the anchor node 104 and with each other. Each communication node 102 may optionally also engage in wireless communications with at least one more-distant node 106. For example, as described in more detail below, the communication nodes 102 may be operated coherently to provide beamforming or other coherent operations involving the more-distant nodes 106.

The communication nodes 102 are generally mobile, which means that the layout of the communication nodes 102 may vary over time. In order to support localization, the communication nodes 102 are configured to engage in various communications with the anchor node 104 and with each other in order to help localize the communication nodes 102. This allows at least some of the nodes 102, 104 to identify the locations of the communication nodes 102 with relatively high accuracy. The same communications or different communications may also optionally be used to support timing synchronization of the communication nodes 102, such as relative to a clock source used by anchor node 104. Each of the communication nodes 102 includes any suitable structure configured to engage in wireless communications with other devices and to engage in communications to support localization and optionally timing synchronization as described in more detail below.

The anchor node 104 generally represents a node that can communicate with the communication nodes 102 to help localize and optionally synchronize the communication nodes 102, such as to support coherent operation of the communication nodes 102. As described in more detail below, electromagnetic signals are communicated between the anchor node 104 and the communication nodes 102 over different signal paths and between the communication nodes 102 to support time-difference-of-arrival calculations. A calculated time-difference-of-arrival is indicative of a one-way time-of-flight or distance between two nodes. In this document, an "electromagnetic" signal generally refers to an electromagnetic field propagating through space, typically at the speed of light in free space and at slower speeds in other transmission media. Depending on the implementation, an electromagnetic signal may include radio waves, microwaves, infrared light, visible light, ultraviolet light, or other electromagnetic radiation.

In some embodiments, the anchor node 104 may have a fixed position during operation of the communication nodes 102. The anchor node 104 in these embodiments may still be portable to some degree, but the anchor node 104 may maintain a fixed position during operation of the communication nodes 102. In other embodiments, the anchor node 104 may not have a fixed position during operation of the communication nodes 102. As a result, the anchor node 104 may move during operation of the communication nodes 102, which may be permissible if, for example, the anchor node 104 can repeatedly localize the communication nodes 102. In any of these embodiments, the anchor node 104 may include a suitable subsystem for accurately identifying its own location, such as a Global Positioning System (GPS) receiver or other Global Navigation Satellite System (GNSS) receiver. The anchor node 104 includes any suitable structure configured to engage in wireless communications with other devices and to localize and optionally synchronize at least some of those other devices as described in more detail below.

Each node 106 represents any suitable device that communicates with at least one of the communication nodes 102 or anchor node 104. For example, a node 106 may represent a distant or covert receiver designed to receive beamformed transmissions from communication nodes 102 that are acting as a coherent beamforming system. Note that while a single node 106 is shown here, the system 100 may include any suitable number of nodes 106, and each node 106 may have any suitable position relative to the other nodes 102, 104 of the system 100.

The nodes 102, 104, 106 here can use any suitable signals to communicate with one another. For example, in some embodiments, at least some of the nodes 102, 104, 106 may use RF signals in the high frequency (HF) band (generally about 3 MHz to about 30 MHz), in the very high frequency (VHF) band (generally about 30 MHz to about 300 MHz), or in the ultra-high frequency (UHF) band (generally about 300 MHz to about 3 GHz), although other frequencies or frequency bands may also be used. As described below, the localization functionality provided in the system 100 may be used to resolve the positions of the communication nodes 102 with very high accuracy, such as with centimeter or millimeter accuracy. In some embodiments, each communication node 102 can be localized to at least one-tenth of the wavelength used by the communication node 102 for communications, including wavelengths used for HF, VHF, or UHF communications. Thus, for instance, a node 102 communicating at a 73-centimeter wavelength in the UHF band may be localized with an accuracy of about 7.3 centimeters or less. Note, however, that the localization approaches described in this patent document may obtain accuracies much better than one-tenth of the wavelength used for communications, depending on the wavelength.

There are various ways in which the system 100 may be implemented or deployed, depending on the application or use case. For example, in some embodiments, the communication nodes 102 may represent devices carried on drones, unmanned aerial systems (UASs), or other flight vehicles, and the anchor node 104 may represent devices carried on ground vehicles or devices situated in ground-based locations. As a particular example, the communication nodes 102 may be implemented using drones that can achieve an altitude of about four hundred feet to about one thousand feet or more, and anchor node 104 may be used on the ground and may be tethered to the drones using optical fibers and power transmission cables. These approaches allow the system 100 to be used to form high-gain aerial ad hoc networks that can be used for various purposes, such as capturing sensor measurements or other information over the local horizon. Note that these operations may occur continuously or on-demand, such as when drones are launched into the air to capture information and then returned to the ground once the desired information has been obtained. The ability to localize and synchronize multiple communication nodes 102 using the anchor node 104 may find use in a number of other implementations, as well.

The ability to organize the communication nodes 102 (and possibly the anchor node 104 if it participates) into a coherent array 108 can provide various benefits or advantages depending on the implementation. For example, a coherent array 108 may function to provide a large single antenna gain, which allows the resulting antenna formed using the nodes to transmit or receive signals at longer distances. As another example, a coherent array 108 may be harder to jam and therefore provide more resilient or reliable operation. As yet another example, a coherent array 108 may be used for azimuth scanning.

This functionality can therefore benefit its users in various ways. For example, this functionality can be used to help provide improved communication capabilities for first responders, armed forces personnel, or other personnel. This functionality can also be used to help improve ground-to-air communications between personnel on the ground and assets in the air. This functionality can further be used to help provide improved stand-off capabilities for personnel, such as when the system 100 can be used to help identify threats earlier or at larger distances. Moreover, this functionality can be used to help organize drone swarms in order to perform functions like "station keeping," where the drones are organized in a specific way and try to maintain that organization during flight. Beyond that, this functionality may be used to improve the operations of automated facilities (such as driver-less automated warehouses) or autonomous vehicles (such as driver-less passenger vehicles, buses, or other vehicles). In addition to these functional or operational benefits, the localization functionality described in this patent document can be achieved at significantly lower costs compared to conventional approaches such as ultra-wideband (UWB) localization. Various approaches for implementing the localization functionality (and optionally the synchronization functionality) to help form coherent arrays or perform other functions are described in more detail below.

Although FIG. 1 illustrates one example of a system 100 supporting localization for mobile ad hoc networks, various changes may be made to FIG. 1. For example, the system 100 may include any suitable numbers and arrangements of nodes 102, 104, 106. Also, the specific arrangement of the communication nodes 102 shown in FIG. 1 can vary over time, and the communication nodes 102 may assume specific arrangements to support desired operations (such as relatively straight lines or generally circular or semi-circular arrangements).

Figure 2A:
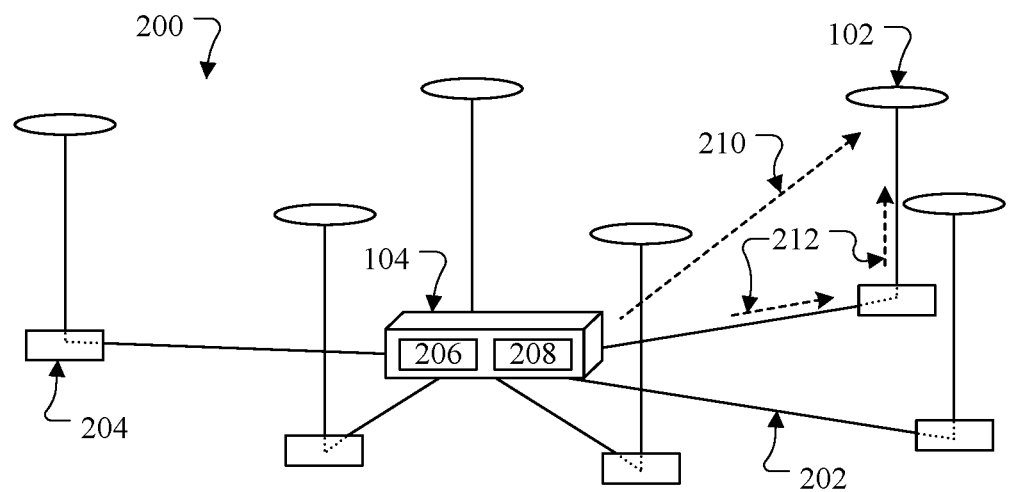
FIGS. 2A and 2B illustrate example communications supporting localization for mobile ad hoc networks in accordance with this disclosure.
Figure 2B:
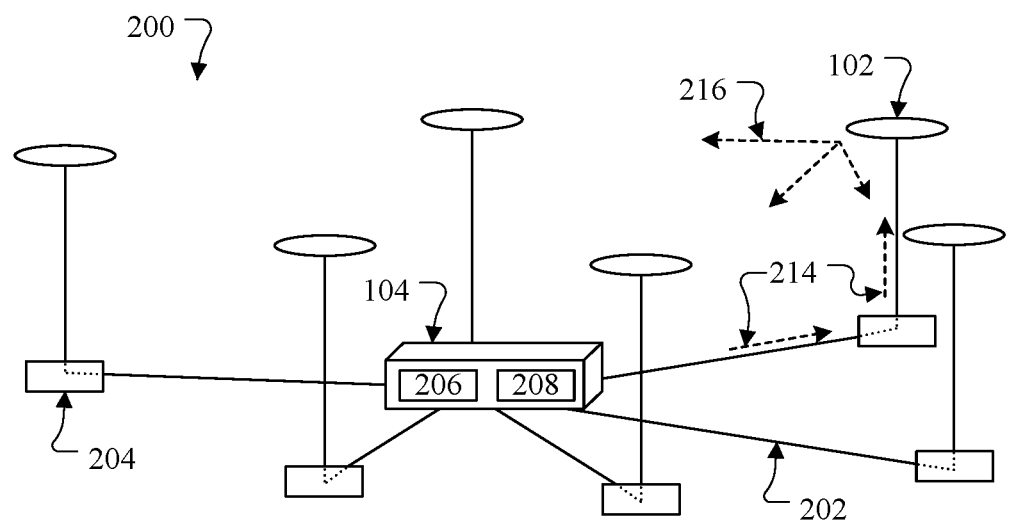

FIGS. 2A and 2B illustrate example communications supporting localization for mobile ad hoc networks in accordance with this disclosure. In particular, FIGS. 2A and 2B illustrate an example way in which electromagnetic signals (including electromagnetic signals sent over different signal paths) may be used to support localization for mobile ad hoc networks. For ease of explanation, the communications shown in FIGS. 2A and 2B are described as being used in the system 100 of FIG. 1. However, the communications shown in FIGS. 2A and 2B may be used in any other suitable system.

As shown in FIG. 2A, the architecture here supports an approach in which communication nodes 102 represent drones, flying discs, or other airborne vehicles tethered to a ground-based anchor node 104 via communication links 202. In this arrangement, the communication nodes 102 can move somewhat but are generally limited in movement by the associated communication link 202. A reel 204 is associated with each communication link 202 and can be used to store and release a portion of the associated communication link 202. As a particular example, each reel 204 can be used to unspool a portion of the communication link 202 after the associated communication node 102 has started flight, allowing that communication node 102 to be raised. Conversely, each reel 204 can be used to re-spool a portion of the communication link 202 as the associated communication node 102 is ending flight, allowing that communication node 102 to be lowered. The communication nodes 102 may be raised and lowered as needed and may obtain any suitable altitude(s), such as about four hundred feet to about one thousand feet or more.

Each communication link 202 represents any suitable physical medium or media configured to transport electromagnetic communications and optionally power between an anchor node 104 and a communication node 102. For example, each communication link 202 may include one or more optical fibers configured to transport optical signals and optionally at least one electrical conductor configured to transport electrical power. Each reel 204 includes any suitable structure configured to store and release at least part of a communication link 202.

Note that in some embodiments, the lengths of the communication links 202 between the anchor node 104 and the communication nodes 102 can be at least substantially equal, and the communication links 202 can be formed using a common transmission medium for electromagnetic signals. Among other things, this allows the anchor node 104 to transmit a signal (such as an RF or other electromagnetic signal) over all of the communication links 202 simultaneously, which allows all of the communication nodes 102 to receive the signal at substantially the same time. This can help to facilitate certain time-difference-of-arrival measurements as described below. However, this is not required, and communication links 202 of non-equal lengths can be used along with some type of compensation for the differing lengths. Also note that it may be possible to use electrical conductors in the communication links 202 as radiators (in addition to the communication nodes 102 themselves) to help support desired operations in various frequency bands.

If power is supplied to the communication nodes 102 by the anchor node 104, the anchor node 104 includes at least one power source 206 configured to provide electrical power to the communication nodes 102. In some embodiments, the power source 206 can be used to provide about 3 kW to about 10 kW of power to the communication nodes 102, although any other suitable amount of power may be provided by the power source 206. The power source 206 includes any suitable source of electrical power, such as a connection to a utility grid, an electrical generator, solar cells, or fuels cells.

The anchor node 104 in this example also includes a range and XYZ solver 208. The range and XYZ solver 208 generally operates to process data from the anchor node 104 and/or one or more communication nodes 102 in order to help localize the one or more communication nodes 102. For example, as described in more detail below, the range and XYZ solver 208 may receive time-difference-of-arrival measurements as measured by the communication nodes 102 based on signals transmitted by the anchor node 104 and calculate distances between the anchor node 104 and the communication nodes 102. The range and XYZ solver 208 may also receive time-difference-of-arrival measurements as measured by the communication nodes 102 based on signals transmitted by the nodes 102, 104 to identify distances between the communication nodes 102. Time-difference-of-arrival measurements may be provided to the solver 208 in any suitable manner, such as via RF, fiber, or other communications. The range and XYZ solver 208 may also use an angle of arrival (such as one determined using an antenna array) in combination with a measured distance to identify a location of a communication node 102. In general, any suitable technique may be used to localize at least one communication node 102 based on one or more time-difference-of-arrival measurements.

The range and XYZ solver 208 includes any suitable structure configured to generate or use time-difference-of-arrival measurements to identify a range and a position of at least one communication node 102. For example, the range and XYZ solver 208 may include one or more processing devices, such as one or more microprocessors, microcontrollers, digital signal processors (DSPs), field programmable gate arrays (FPGAs), application specific integrated circuits (ASICs), or discrete circuitry. As a particular example, the range and XYZ solver 208 may include or implement a tracking extended Kalman filter (EKF) to process time-difference-of-arrival measurements, which can help to improve the accuracy of the distance/position estimates related to the communication node 102. Note that while the range and XYZ solver 208 is shown here as being part of the anchor node 104, the solver 208 may form part of at least one communication node 102 or be separate from the nodes 102, 104.

In one aspect of operation as shown in FIG. 2A, an anchor node 104 transmits an electromagnetic signal 210 (such as an RF signal) to each communication node 102 over a first signal path, and the anchor node 104 transmits another electromagnetic signal 212 (such as another RF signal) to each communication node 102 over a second signal path. Note that while the signals 210, 212 are shown in FIG. 2A as being sent to a single communication node 102, this is merely for convenience of illustration. The anchor node 104 may transmit signals 210, 212 to all communication nodes 102 at the same time, or the anchor node 104 may transmit signals 210, 212 to different communication nodes 102 at different times. In this example, the electromagnetic signal 210 is transmitted over-the-air, while the electromagnetic signal 212 is transmitted over the communication links 202. Since the signal paths diverge here, the electromagnetic signals 210 and 212 follow different paths between the anchor node 104 and each communication node 102. Also, the signal paths here can have different lengths and use different transmission media, causing the electromagnetic signals 210 and 212 to travel at different speeds between the anchor node 104 and each communication node 102.

In some embodiments, for each communication node 102, the electromagnetic signal 210 transmitted between the anchor node 104 and that communication node 102 follows a signal path generally representing the hypotenuse of a triangle, while the electromagnetic signal 212 transmitted over the communication link 202 connected to that communication node 102 follows a signal path generally representing the other two sides of the triangle. Assuming the two shorter sides of the triangle are about equal in length, each side of the triangle is about 0.707 times the length of the hypotenuse of the triangle. As a result, the electromagnetic signal 212 transmitted over the communication link 202 travels a distance that is about 41.4% longer than the distance traveled by the electromagnetic signal 210 transmitted to the same communication node 102 (if the communication link 202 has been fully unspooled from the associated reel 204 and the associated reel 204 contains no additional portion of the communication link 202). Assuming the communication link 202 includes a transmission medium that transports electromagnetic signals at a speed that is about 0.7 times the speed of light, the electromagnetic signal 212 would traverse the communication link 202 in roughly twice the time that it takes for the electromagnetic signal 210 to traverse the distance between the anchor node 104 and the communication node 102. Note that these values are for illustration only and can vary based on the circumstances and the implementation. Also note that the shape here is typically not perfectly triangular since the communication node 102 can often sway or otherwise move somewhat during flight (such as due to the wind) and some portion of the communication node 102 may remain spooled on the associated reel 204. Generally speaking, however, this illustrates how receipt of the electromagnetic signal 212 at each communication node 102 can be delayed relative to receipt of the electromagnetic signal 210 at each communication node 102. This facilitates easier measurement of a time difference between receipt of the electromagnetic signal 210 at a communication node 102 and receipt of the electromagnetic signal 212 at the communication node 102 with a less-accurate clock source.

Given these signals 210 and 212, each communication node 102 may start a timer upon reception of the first electromagnetic signal 210 from the anchor node 104 and stop the timer upon reception of the second electromagnetic signal 212 from the anchor node 104. The time as measured by the timer at each communication node 102 represents a time-difference-of-arrival between the electromagnetic signals 210, 212 at that communication node 102. In this example, the electromagnetic signal 210 generally travels in a straight line from the anchor node 104 to each communication node 102, and the electromagnetic signal 210 generally travels at the speed of light when traveling through free space. The electromagnetic signal 212 follows a different signal path, but the overall length of that signal path and the speed of the electromagnetic signal 212 in the transmission medium of that signal path are generally known. For instance, the electromagnetic signal 212 may travel between the anchor node 104 and each communication node 102 through an optical fiber having a known length, and the speed of the electromagnetic signal 212 in the optical fiber can be determined based on factors such as the index of refraction of the material(s) forming the optical fiber and the bend(s) in the optical fiber. The distance between the anchor node 104 and each communication node 102 can therefore be identified (such as by the range and XYZ solver 208) based on the geometry of the associated communication link 202, the known speed of the electromagnetic signal 210, the known speed of the electromagnetic signal 212, the known length of the associated communication link 202, and the time-difference-of-arrival between the signals 210, 212 as measured by that communication node 102.

Note that a measured time-difference-of-arrival here may include differences in the processing times of a communication node 102 when processing the two electromagnetic signals 210, 212. Each processing time generally represents the amount of time needed for a node to process a received signal, recognize the received signal, and trigger a corresponding action (such as starting or stopping a timer). If the processing times associated with the electromagnetic signals 210 and 212 are substantially the same regardless of the transmission medium or signal path over which the signals 210 and 212 are received, little or no modification may be needed to a measured time-difference-of-arrival (since the same delay generally occurs between receipt of the signal 210 to starting the timer and between receipt of the signal 212 to stopping the timer). However, if the processing times associated with the electromagnetic signals 210 and 212 are not substantially the same, the measured time-difference-of-arrival can be pre-processed by adding time to the measured time (if there is a greater processing time for the electromagnetic signal 212 than for the electromagnetic signal 210) or by subtracting time from the measured time (if there is a greater processing time for the electromagnetic signal 210 than for the electromagnetic signal 212). Of course, other mechanisms can also be used to compensate for a difference in processing times, such as by delaying a start or stop signal for a timer based on the difference in processing times. These processing times can typically be designed or determined by simple calibration with suitable accuracy to allow adjustment of the measured time-difference-of-arrival or delay of a timer control signal.

In another aspect of operation as shown in FIG. 2B, the anchor node 104 transmits an electromagnetic signal 214 (such as an RF signal) to each communication node 102 over the communication links 202, and each communication node 102 responds by transmitting an additional electromagnetic signal 216 (such as an RF signal) to the anchor node 104 and to the other communication nodes 102. Note that while the signal 214 is shown in FIG. 2B as being sent to a single communication node 102 and the single communication node 102 is shown in FIG. 2B as transmitting the signal 216, this again is merely for convenience of illustration. The anchor node 104 may transmit a signal 214 to all communication nodes 102 at the same time, or the anchor node 104 may transmit a signal 214 to different communication nodes 102 at different times. Also, each communication node 102 may be configured to transmit a signal 216 upon receipt of the signal 214 or after a specified amount of time passes from receipt of the signal 214. For the signal 216 from each specified communication node 102, the anchor node 104 measures a time-difference-of-arrival between transmission of the signal 214 and reception of the signal 216 from the specified communication node 102, and the other communication nodes 102 measure a time-difference-of-arrival between reception of the signal 214 from the anchor node 104 and reception of the signal 216 from the specified communication node 102.

These time-difference-of-arrival measurements can again be pre-processed, such as to remove processing times of the nodes 102, 104 and to compensate for any processing time differences associated with receipt of the signals 214, 216 over different transmission media and signal paths. These time-difference-of-arrival measurements can again be processed (such as by the range and XYZ solver 208) to identify distances between the anchor node 104 and the communication nodes 102 and to identify distances between the communication nodes 102 themselves.

Overall, this functionality allows distances between the anchor node 104 and the communication nodes 102 and distances between the communication nodes 102 to be identified accurately. The range and XYZ solver 208 can then use all of the identified distances to calculate the actual positions of the communication nodes 102 with respect to the anchor node 104 (and possibly with respect to one another). The range and XYZ solver 208 can use any suitable mechanisms to identify the positions of the communication node 102 here. For example, since each time-difference-of-arrival measurement is indicative of a distance between two nodes, the range and XYZ solver 208 could use one of various triangulation algorithms to identify the actual locations of the communication nodes 102 relative to the anchor node 104. Note, however, that any other suitable techniques may be used here.

The identified locations of the communication nodes 102 may be used in any suitable manner. For example, the positions of the communication nodes 102 may be provided to the communication nodes 102 and the anchor node 104 for use, such as when the anchor node 104 uses the known locations to cause the communication nodes 102 to operate coherently or to adjust the position of at least one of the communication nodes 102. The range and XYZ solver 208 or the anchor node 104 may also use the identified locations of the communication nodes 102 with a Kalman filter to help improve the localization of the communication nodes 102.

Note that in some cases, the position of each of the communication nodes 102 may vary within only a small amount of space during flight. For example, each reel 204 may allow a known amount of the associated communication link 202 to unspool during operation, so the approximate height of each communication node 102 may be known ahead of time. Also, drones or other communication nodes 102 may include GPS or other GNSS receivers or other mechanisms that allow the approximate location of each communication node 102 to be determined, and each communication node 102 may attempt to maintain a certain location once deployed. Given variables like wind speed and GNSS accuracy, each communication node 102 may (on its own) be capable of maintaining its position to within a small distance from a given location (such as within about five to ten feet of a setpoint location). In these embodiments, because the communication nodes 102 have a limited ability to move away from their setpoint locations, this can greatly simplify the operations performed by the range and XYZ solver 208, since the general locations of the communication nodes 102 can be known ahead of time.

One advantage of this approach is that clock sources in various pairs of nodes do not need to be synchronized in order to identify distances between those nodes, and the clock source in only one of the two nodes in each pair may be used to measure a time-difference-of-arrival. That is, each communication node 102 may measure a period of time between receipt of the signals 210 and 212 in order to capture a time-difference-of-arrival measurement, and each node 102 and 104 may measure a period of time between receipt of the signals 214 and 216 in order to capture a time-difference-of-arrival measurement. As a result, synchronized clock sources among all of the nodes 102, 104 are not required for these functions to occur successfully. Also, any or all of the electromagnetic signals 210-216 may be encoded with data, such as an identifier of the node transmitting the electromagnetic signal and/or location data (like a known location of the node transmitting the electromagnetic signal). The use of encoded data may allow, for instance, an anchor node 104 to inform a communication node 102 of its approximate position, to instruct a particular communication node 102 to transmit a signal 216, or to provide any other desired data to the communication nodes 102. Further, because the communication links 202 can have a common length, there may be no need for timing corrections at the communication nodes 102, and the system can implement tight timing loops using the communication links 202. In addition, because the signals 212 and 214 can be sent over physical communication links 202, this provides for high-azimuth diversity of localization pulses, thereby helping to reduce multipath issues and jamming. Finally, since fast pulse timing can be used over optical fibers or other communication links 202, the system can achieve much faster and much more repetitive operation, such as when the system can operate at a loop rate of about 100 Hz to about 500 Hz (although other loop rates, such as about 20 Hz, may be used). This allows much smaller wavelengths to be used, possibly even millimeter-wave (MMW) wavelengths, which may allow the overall system to operate as an interferometer or achieve other small-wavelength operations.

As a particular example here, there can be a diversity of incoming signals from each of the communication nodes 102, such as when the communication nodes 102 are sequentially pinged by the anchor node 104, which establishes diversity sampling of the various signals. Among other things, this helps in the ability to isolate jamming sources, as the group of communication nodes 102 can establish nulling of external jamming sources with great specificity. As a result, the system supports improved anti-jamming capabilities, including anti-jamming localization, which makes the system well-adapted for applications such as surveillance. It is also possible to vary the order in which the nodes 102 transmit the electromagnetic signals 216 (such as based on a predetermined or randomized sequence known to the anchor node 104), which again can help improve the anti-jamming capabilities of the system.

Note that in FIG. 2A, the signals 210 and 212 can be transmitted simultaneously from the anchor node 104 to individual communication nodes 102 or to all communication nodes 102 in some embodiments. In other embodiments, there may be some delay between transmissions of the signals 210 and 212 from the anchor node 104 to one or more of the communication nodes 102, in which case any measured time-difference-of-arrival can be pre-processed to account for the associated delay. Similarly, note that in FIG. 2B, the signal 214 may be sent from the anchor node 104 to all communication nodes 102 simultaneously and the communication nodes 102 may have different delays for sending the signals 216 in some embodiments, in which case any measured time-difference-of-arrival can be pre-processed to account for the different delays. In general, various signals used here can be transmitted sequentially or simultaneously depending on the implementation.

In addition, it should be noted that the process described above may result in the generation of multiple time-differences-of-arrival or distances between two nodes. For example, time-differences-of-arrival or distances associated with the anchor node 104 and a specific communication node 102 may be determined based on the signals 210-212 as shown in FIG. 2A and based on the signals 214-216 as shown in FIG. 2B. Depending on the implementation, one time-difference-of-arrival or distance may be used and the other time-difference-of-arrival or distance may be discarded, or the time-differences-of-arrival or distances may be averaged or otherwise processed together. Alternatively, operations in the system can be modified so that only one time-difference-of-arrival or distance is determined between each pair of nodes, such as when the anchor node 104 does not measure a time-difference-of-arrival using the signals 214, 216.

Although FIGS. 2A and 2B illustrate one example of communications supporting localization for mobile ad hoc networks, various changes may be made to FIGS. 2A and 2B. For example, part or all of the process shown in FIGS. 2A and 2B may occur repeatedly in order to identify multiple time-differences-of-arrival or distances between each of various pairs of nodes, which can then be averaged or otherwise processed to identify a final time-difference-of-arrival or distance between each pair of nodes.

Figure 3:
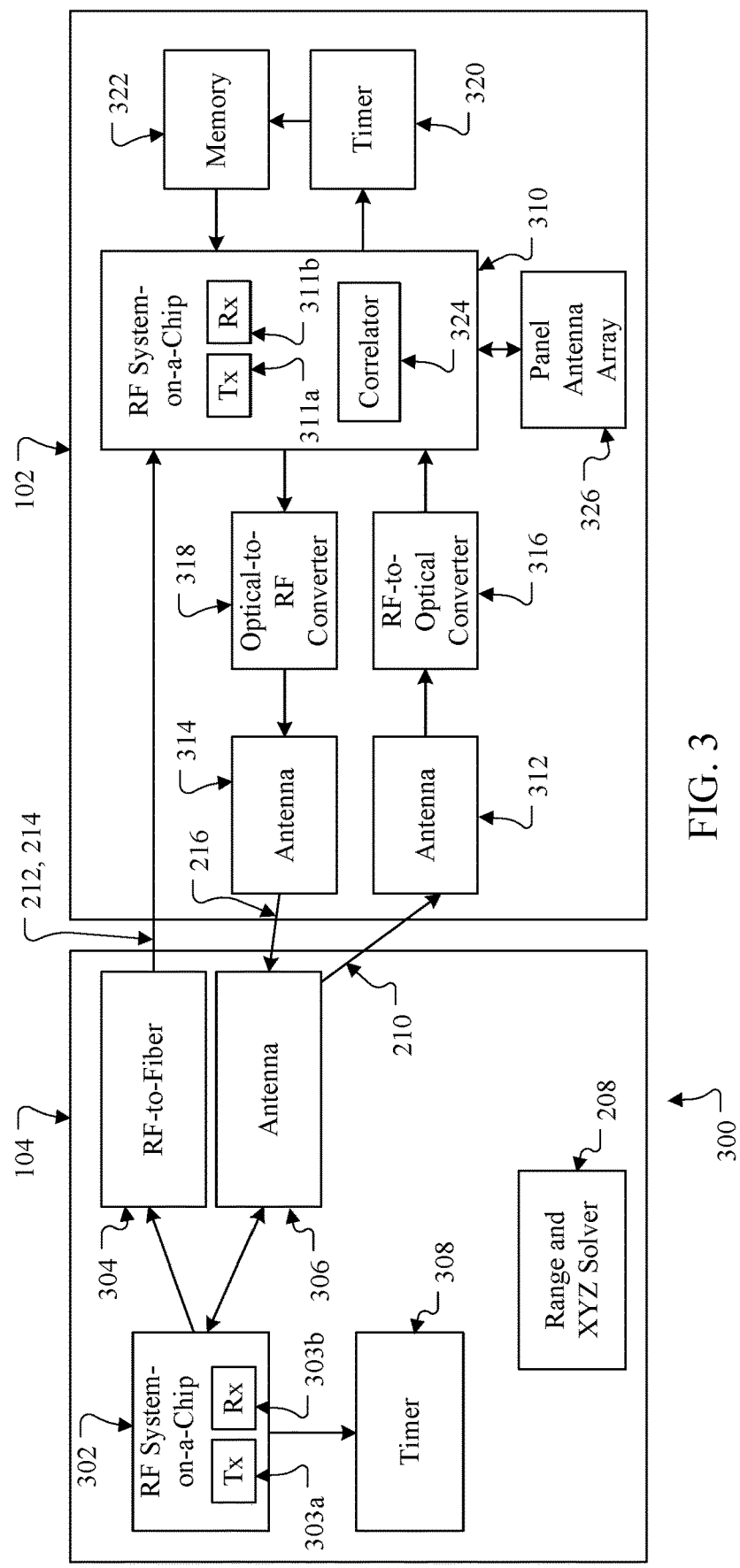
FIG. 3 illustrates an example architecture for devices supporting localization for mobile ad hoc networks in accordance with this disclosure.

FIG. 3 illustrates an example architecture 300 for devices supporting localization for mobile ad hoc networks in accordance with this disclosure. In particular, the architecture 300 in FIG. 3 shows an example implementation of an anchor node 104 and an example implementation of a communication node 102 supporting localization operations. For ease of explanation, the architecture 300 of FIG. 3 is described as being used in the system 100 of FIG. 1 along with the communication scheme shown in FIGS. 2A and 2B. However, the architecture 300 of FIG. 3 may be used in any other suitable system and with any other suitable communication scheme.

As described above, the anchor node 104 may communicate with each communication node 102 over-the-air and through an associated communication link 202, which supports the transmission of the electromagnetic signals 210-216. Each of the electromagnetic signals 210-216 may represent a pulse train, which refers to a sequence of pulses in a known pattern. In the example shown in FIG. 3, the anchor node 104 and the communication nodes 102 include various components that support these functions. For example, the anchor node 104 includes an RF system-on-a-chip (RFSOC) 302, one or more RF-to-fiber converters 304, and one or more antennas 306. In some embodiments, the anchor node 104 includes multiple RF-to-fiber converters 304, such as one RF-to-fiber converter 304 for each communication node 102 tethered to the anchor node 104 by a communication link 202. Also, in some embodiments, the anchor node 104 may include one antenna 306 or multiple antennas 306.

The RF system-on-a-chip 302 generally includes various components used to generate and process RF signals. For example, the RF system-on-a-chip 302 can be used to generate RF pulse trains that are provided to the RF-to-fiber converter(s) 304 and the antenna(s) 306 to support the generation of the electromagnetic signals 210-214. The RF system-on-a-chip 302 can also receive the electromagnetic signal 216 from each of the communication nodes 102 via the antenna(s) 306. The RF system-on-a-chip 302 can further start a timer 308 upon transmission of a signal 214 and stop the timer 308 upon reception of a signal 216 to support time-difference-of-arrival measurements associated with the communication nodes 102 as described above. The RF system-on-a-chip 302 can perform other functions as needed or desired. The RF system-on-a-chip 302 includes any suitable structure for generating RF signals for transmission and for processing received RF signals, such as at least one transmitter 303a configured to generate RF signals and at least one receiver 303b configured to process RF signals. Note, however, that the use of a "system-on-a-chip" is not required and that discrete components may also be used to implement the functions of the RF system-on-a-chip 302.

Each RF-to-fiber converter 304 is used to convert RF signals received from the RF system-on-a-chip 302 into optical signals (the electromagnetic signals 212 and 214) for transmission over an optical fiber in a communication link 202. Each RF-to-fiber converter 304 includes any suitable structure configured to generate an optical output based on an RF input, such as a BROADCOM AFBR-1310Z fiber optic transmitter, optionally with a micro software-defined radio (SDR) waveform generator. The RF signal from the RF system-on-a-chip 302 or the optical signal from the RF-to-fiber converter 304 may optionally be encoded with data, such as an identifier of a specific communication node 102 that is being localized or information associated with the anchor node 104.

Each antenna 306 can be used to transmit RF signals (the electromagnetic signals 210) to at least one of the communication nodes 102 and receive RF signals (the electromagnetic signals 216) from at least one of the communication nodes 102. Each antenna 306 represents any suitable structure configured to transmit and receive electromagnetic signals through free space, such as an azimuth antenna. The timer 308 represents any suitable structure configured to measure a period of time, such as a TUCSON AMATEUR PACKET RADIO CORP. TICC timestamping/time interval counter.

In this example, each communication node 102 includes an RF system-on-a-chip 310, one or more antennas 312 and 314, an RF-to-optical converter 316, and an optical-to-RF converter 318. The RF system-on-a-chip 310 generally includes various components used to generate and process RF signals. For example, the RF system-on-a-chip 310 can be used to process the RF pulse trains that are received from the anchor node 104 via the communication link 202 and the antenna 312, thereby supporting receipt of the electromagnetic signals 210-214. The RF system-on-a-chip 310 can also generate the electromagnetic signal 216 that is sent to the anchor node 104 and the other communication nodes 102 via the antenna 314. The RF system-on-a-chip 310 can further start a timer 320 upon reception of a signal 210 and stop the timer 320 upon reception of a signal 212 to support time-difference-of-arrival measurements associated with the communication node 102 as described above. The RF system-on-a-chip 310 can perform other functions as needed or desired. The RF system-on-a-chip 310 includes any suitable structure for generating RF signals for transmission and for processing received RF signals, such as at least one transmitter 311a configured to generate RF signals and at least one receiver 311b configured to process RF signals. Note, however, that the use of a "system-on-a-chip" is not required and that discrete components may also be used to implement the functions of the RF system-on-a-chip 310.

The antennas 312 and 314 can be used to receive the electromagnetic signals 210 from the anchor node 104, transmit some of the electromagnetic signals 216 to the other communication nodes 102, and receive others of the electromagnetic signals 216 from the other communication nodes 102. Each antenna 312, 314 represents any suitable structure configured to transmit and receive electromagnetic signals through free space. Note that while two antennas 312 and 314 are shown here, a single antenna could be used to receive the signals 210, 216 and to transmit the signal 216.

The RF-to-optical converter 316 is used to convert an incoming RF signal (such as the electromagnetic signal 210) into an optical signal suitable for use by the RF system-on-a-chip 310. The RF-to-optical converter 316 includes any suitable structure configured to generate an optical signal based on an RF input, such as a BROADCOM AFBR-2310Z fiber optic receiver. The optical-to-RF converter 318 is used to convert an incoming optical signal into an RF signal (such as the electromagnetic signal 216). The optical-to-RF converter 318 includes any suitable structure configured to generate an RF signal based on an optical input, such as a BROADCOM AFBR-1310Z fiber optic transmitter, optionally with a micro-SDR waveform generator. The timer 320 represents any suitable structure configured to measure a period of time, such as a TUCSON AMATEUR PACKET RADIO CORP. TICC timestamping/time interval counter. Time-difference-of-arrival measurements from the timer 320 can be stored in a memory 322, which represents any suitable volatile or non-volatile storage and retrieval device or devices, such as random-access memory, Flash memory, hard disc, or other storage device.

In this example, the RF system-on-a-chip 310 includes or supports a correlator 324, which can be used to start and stop the timer 320 based on received signals. For example, the correlator 324 can start the timer 320 upon detecting reception of a signal 210 and stop the timer 320 after correlating another received signal 212 to the signal 210. Thus, for example, the same waveform can be used in the signals 210 and 212, and the correlator 324 can receive incoming signals and correlate the signals 210 and 212 based on their common waveform. The correlator 324 represents any suitable structure configured to correlate signals received over different transmission media, such as an FPGA or other processing device.

It should be noted here that the use of discrete timers 308, 320 is not required and that the timers 308, 320 may be implemented in any other suitable manner. For example, each of the timers 308, 320 could be implemented within the associated RF system-on-a-chip 302, 310. As another example, each node 102, 104 may include a node controller that controls the overall operations of the node, and each of the timers 308, 320 could be implemented within the associated node controller.

In this example, the communication node 102 further includes a panel antenna array 326, which represents an antenna array that can be used by the communication node 102 to perform operations such as beamforming. The panel antenna array 326 may use any suitable frequencies or frequency ranges to communicate, such as HF, VHF, or UHF. The panel antenna array 326 includes any suitable array of antenna elements supporting desired wireless communication functionality or other wireless functionality.

The range and XYZ solver 208 can be used in the anchor node 104 (or outside the anchor node 104) to process the time-difference-of-arrival values as measured by the anchor node 104 and the various communication nodes 102. For example, as noted above, a signal 212 sent over a communication link 202 may take longer to travel from the anchor node 104 to a communication node 102 compared to the signal 210, allowing the communication node 102 to measure the time-difference-of-arrival for the signals 210, 212. In some embodiments, the anchor node 104 can send the same signal 210 over the air and send the same signal 212 over the communication links 202 to all of the communication nodes 102. Assuming the lengths of the communication links 202 are substantially equal, this would allow all of the communication nodes 102 to identify a time-difference-of-arrival for the signals 210, 212 at substantially the same time (although this is not required). The anchor node 104 may also transmit one or more signals 214 over the communication links 202 to the communication nodes 102, triggering each of the communication nodes 102 to transmit a signal 216. The anchor node 104 and the other communication nodes 102 can identify a time-difference-of-arrival for the signals 214, 216, which may be repeated for each communication node 102 in the group. The range and XYZ solver 208 can use these various time-difference-of-arrival measurements to identify distances between the nodes and to identify locations of the communication nodes 102 relative to the anchor node 104.

Although FIG. 3 illustrates one example of an architecture 300 for devices supporting localization for mobile ad hoc networks, various changes may be made to FIG. 3. For example, various components shown in FIG. 3 may be combined, further subdivided, rearranged, or omitted and additional components can be added according to particular needs. Also, any other suitable techniques may be used to generate RF or other electromagnetic signals, and optical-to-RF and RF-to-optical conversions may or may not be needed.

Figure 4:
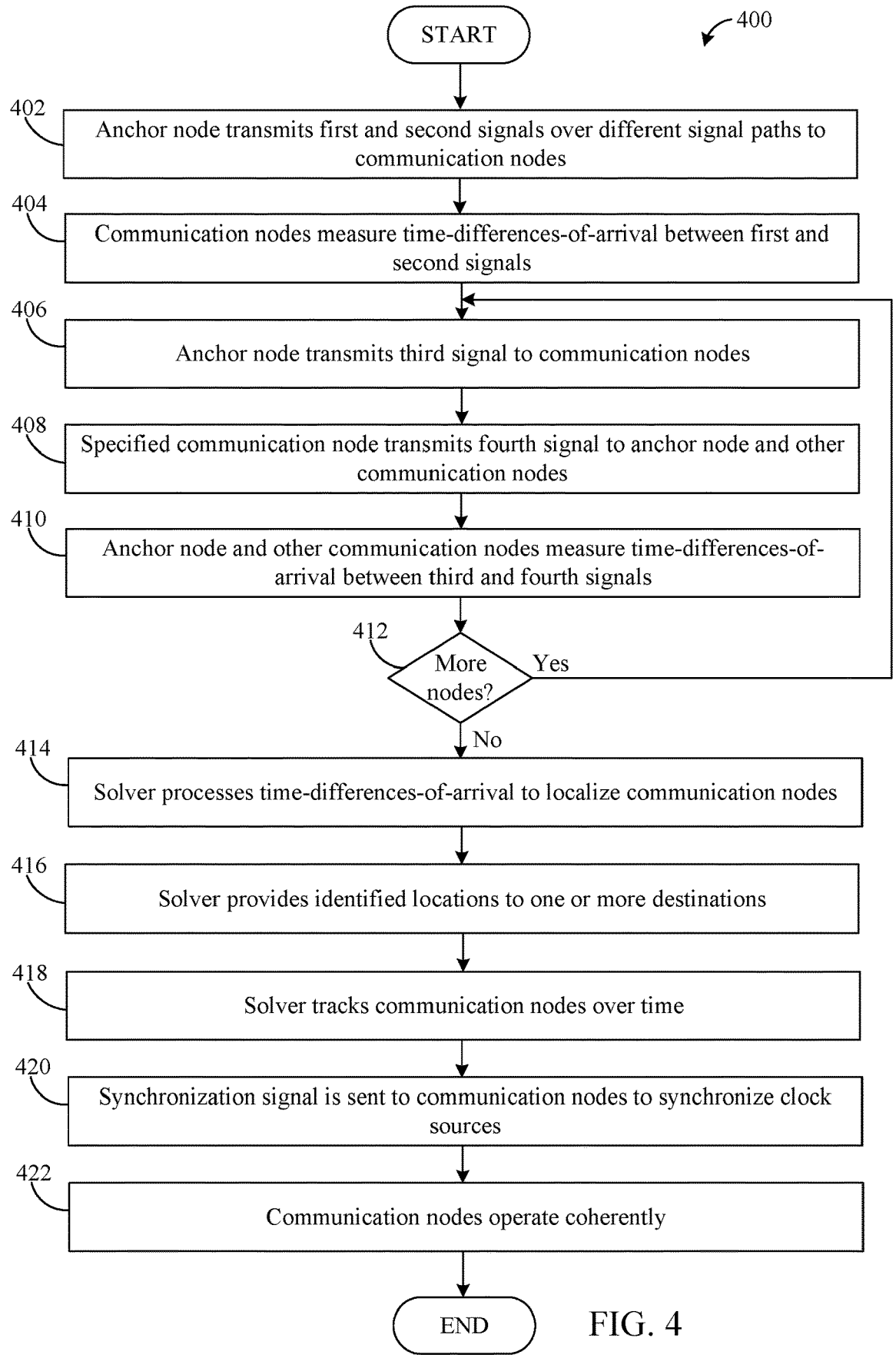
FIG. 4 illustrates an example method for localization using signals transmitted over different signal paths in mobile ad hoc networks in accordance with this disclosure.

FIG. 4 illustrates an example method 400 for localization using signals transmitted over different signal paths in mobile ad hoc networks in accordance with this disclosure. For ease of explanation, the method 400 may be described as involving the communication and anchor nodes 102, 104 of FIG. 1 supporting the communication scheme and technique shown in FIGS. 2A and 2B. However, the method 400 may involve the use of any other suitable nodes and any communication schemes and techniques implemented according to the teachings of this disclosure.

As shown in FIG. 4, an anchor node transmits first and second signals over different signal paths to at least one communication node at step 402. This may include, for example, the anchor node 104 transmitting the electromagnetic signal 210 over the air to each of one or more communication nodes 102 and transmitting the electromagnetic signal 212 over one or more communication links 202 to the communication node(s) 102. Each communication node measures a time-difference-of-arrival of the first and second signals at step 404. This may include, for example, each communication node 102 using a timer 320 or other component to measure a time period between receipt of the signal 210 and receipt of the signal 212. Each measured time-difference-of-arrival can also be pre-processed to remove any processing time associated with the associated communication node 102 capturing the measurement.

The anchor node transmits at least one third signal to multiple communication nodes at step 406. This may include, for example, the anchor node 104 transmitting the electromagnetic signal 214 over the communication links 202 to the communication nodes 102. A specified communication node transmits a fourth signal to the anchor node and to other communication nodes at step 408. This may include, for example, a specified communication node 102 transmitting the electromagnetic signal 216 to the anchor node 104 and to the other communication node(s) 102. Each of the anchor node and the other communication nodes measures a time-difference-of-arrival of the third and fourth signals at step 410. This may include, for example, the anchor node 104 using a timer 308 or other component to measure a time period between transmission of the signal 214 and receipt of the signal 216 and each of the other communication nodes 102 using a timer 320 or other component to measure a time period between receipt of the signal 214 and receipt of the signal 216. Each measured time-difference-of-arrival can also be pre-processed to remove any processing time associated with the specified communication node 102 and with each node 102, 104 capturing the measurement.

A decision is made whether the anchor node needs to transmit a third signal to any additional communication nodes at step 412. If so, the process repeats steps 406-410. Note, however, that other implementations may not require all three steps to be repeated. For instance, each of the communication nodes 102 may transmit its signal 216 at a predefined or other specified time following receipt of the original signal 214. In these embodiments, step 406 may occur once, while steps 408-410 may be repeated.

A solver processes the identified time-differences-of-arrival to localize each communication node at step 414. This may include, for example, a range and XYZ solver 208 obtaining one or more identified time-differences-of-arrival from one or more nodes 102, 104 (although the solver 208 may form a part of at least one of the nodes 102, 104). This may also include the solver 208 using the identified time-differences-of-arrival and the known location of the anchor node 104 to identify the location of each communication node 102 (such as via triangulation or other suitable technique).

Once the one or more communication nodes 102 have been localized, the location(s) of the communication node(s) 102 may be used in any suitable manner. For instance, the identified locations may be provided to one or more destinations at step 416, such as when the solver transmits the identified locations to the communication nodes 102, anchor node 104, or other nodes. This may allow, for example, the communication nodes 102 to alter their positions in order to obtain desired positions or a desired layout. The solver can track the location(s) of the communication node(s) over time at step 418. This may include, for example, the solver using extended Kalman filter tracking to improve the localization of each communication node 102 as time progresses. A synchronization signal can be sent to the one or more communication nodes in order to synchronize the clock source(s) of the communication node(s) at step 420. This may include, for example, an anchor node 104 or other device transmitting an RF or other electromagnetic signal to the communication nodes 102 in order to synchronize the clocks of the communication nodes 102. In addition, multiple communication nodes may operate in a coherent manner to provide desired functionality at step 422. This may include, for example, the communication nodes 102 operating to provide beamforming or to function as a high-gain synthetic aperture directional antenna.

Although FIG. 4 illustrates one example of a method 400 for localization using signals transmitted over different signal paths in mobile ad hoc networks, various changes may be made to FIG. 4. For example, while shown as a series of steps, various steps in FIG. 4 may overlap, occur in parallel, occur in a different order, occur any number of times, or be omitted. As a particular example, the RF or other electromagnetic signal used for synchronization in step 420 may represent one of the electromagnetic signals transmitted during localization operations in one or more of steps 402-410. As another example, one or more locations of one or more nodes may be used in any other suitable manner, and this disclosure is not limited to using multiple nodes coherently based on the localization.

Figure 5:
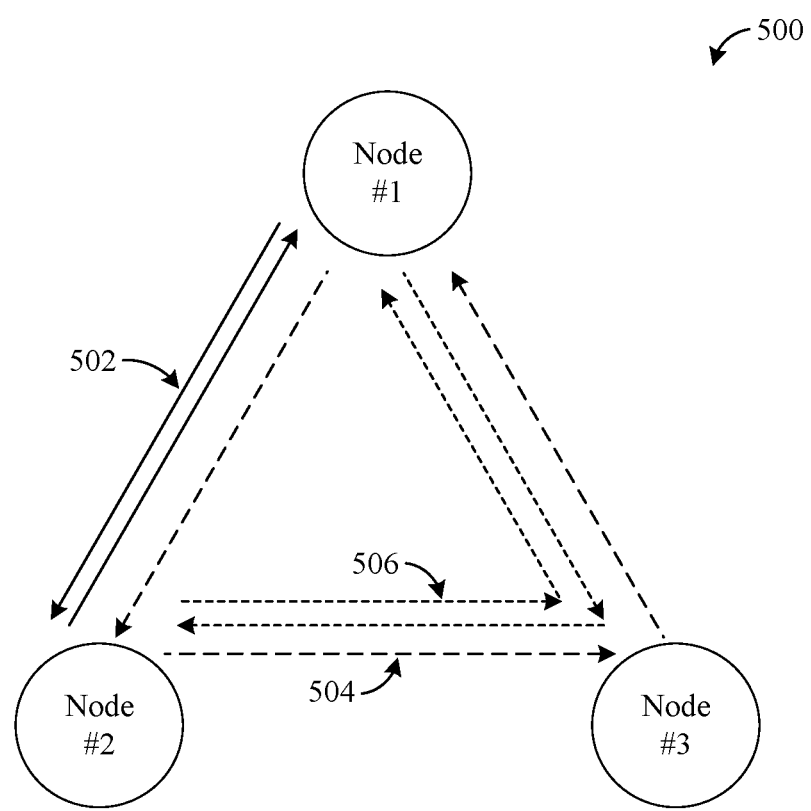
FIG. 5 illustrates an example technique for identifying a time delay associated with a node in a mobile ad hoc network in accordance with this disclosure.

FIG. 5 illustrates an example technique 500 for identifying a time delay associated with a node in a mobile ad hoc network in accordance with this disclosure. For ease of explanation, the technique 500 shown in FIG. 5 is described as being used in the system 100 of FIG. 1. However, the technique 500 shown in FIG. 5 may be used in any other suitable system.

As noted above, the processing time needed by a node 102 or 104 to receive and detect a signal and perform some action in response (such as generating and transmitting another signal or starting/stopping a timer) can be designed or determined in order to subtract that processing time from a time measurement generated by a timer. This is done in order to generate an accurate time-difference-of-arrival measurement. While it is often possible during manufacturing to place two nodes a known distance apart and transmit signals back-and-forth between the nodes to identify each node's processing time delay, this may not always be adequate. For instance, the time delay measured in a factory can drift over time or as environmental conditions change, which subsequently causes time or distance measurements to drift. As a particular example, extreme temperatures may cause processing times of nodes to vary.

As shown in FIG. 5, the technique 500 disclosed here can be used with three nodes denoted Node #1, Node #2, and Node #3. During a first set of communications 502, Node #1 transmits a signal to Node #2, and Node #2 responds by transmitting a signal back to Node #1. The amount of time between transmission of the signal to Node #2 and the reception of the signal from Node #2 can be measured at Node #1, such as with a timer 308, 320. This time may be denoted $T_{121}$. Note that these communications 502 may occur once, or the communications 502 may occur multiple times so that multiple time measurements can be averaged to identify the time $T_{121}$.

During a second set of communication 504, Node #1 transmits a signal to Node #2, Node #2 responds by transmitting a signal to Node #3, and Node #3 responds by transmitting a signal to Node #1. The amount of time between transmission of the signal to Node #2 and the reception of the signal from Node #3 can be measured at Node #1, such as with the timer 308, 320. This time may be denoted $T_{1231}$. Note that these communications 504 may occur once, or the communications 504 may occur multiple times so that multiple time measurements can be averaged to identify the time $T_{231}$.

During a third set of communication 506, Node #1 transmits a signal to Node #3, Node #3 responds by transmitting a signal to Node #2, Node #2 responds by transmitting a signal to Node #3, and Node #3 responds by transmitting a signal to Node #1. The amount of time between transmission of the signal to Node #3 and the reception of the signal from Node #3 can be measured at Node #1, such as with the timer 308, 320. This time may be denoted $T_{13231}$. Note that these communications 506 may occur once, or the communications 506 may occur multiple times so that multiple time measurements can be averaged to identify the time $T_{13231}$.

Assuming all three nodes experience substantially the same processing time delay, the processing time associated with each node can be calculated using a formula of:

$$T_d = 2T_{1231} - T_{13231} - T_{121}$$

where $T_d$ represents the processing time delay common to all three nodes. Note that it is routine for multiple nodes to perform the same processing and number of calculations (even when some calculations are unnecessary or redundant) so that the nodes have substantially the same processing time delay. If nodes are not designed to perform the same processing and number of calculations, other techniques involving transmissions among the nodes may be used to identify the processing time delay of each node.

Note that the technique 500 shown in FIG. 5 can be repeated any number of times during operation of the nodes. For example, the processing time delays of the nodes may be determined continuously or repeatedly during operation of the nodes in order to account for drifts or other changes in the processing time delays of the nodes. This helps to increase the accuracy of the localization operations described above. The determined time delays here can be used by one or more communication nodes 102, anchor node 104, the range and XYZ solver 208, or other component(s) to identify ranges between the nodes 102, 104.

Although FIG. 5 illustrates one example of a technique 500 for identifying a time delay associated with a node in a mobile ad hoc network, various changes may be made to FIG. 5. For example, any other suitable techniques may be used to identify processing time delays associated with nodes, including the use of one or more preprogrammed or other predefined processing time delays.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the scope of this disclosure, as defined by the following claims.

What is claimed is:

1. A method comprising:
   transmitting a first electromagnetic signal from a first node to a second node through free space;
   transmitting a second electromagnetic signal from the first node to the second node through a communication link, the communication link physically coupling the first and second nodes and having a known length; and
   identifying a distance between the first and second nodes based on (i) a time-difference-of-arrival between reception of the first electromagnetic signal at the second node and reception of the second electromagnetic signal at the second node and (ii) the known length of the communication link.

2. The method of claim 1, wherein:
   transmitting the first electromagnetic signal comprises transmitting the first electromagnetic signal from the first node to multiple second nodes through free space; and
   transmitting the second electromagnetic signal comprises transmitting the second electromagnetic signal from the first node to the second nodes through multiple communication links.

3. The method of claim 2, further comprising:
   transmitting a third electromagnetic signal from the first node to the second nodes, the third electromagnetic signal causing at least some of the second nodes to transmit a fourth electromagnetic signal; and
   identifying one or more distances between the second nodes based on time-differences-of-arrival between reception of the third and fourth electromagnetic signals at one or more of the second nodes.

4. The method of claim 3, wherein at least one of:
   the first electromagnetic signal is transmitted from the first node to all of the second nodes simultaneously through free space; and
   the third electromagnetic signal is transmitted from the first node to all of the second nodes simultaneously over the communication links.

5. The method of claim 3, wherein:
   the first and fourth signals comprise radio frequency (RF) signals;
   the second and third signals comprise optical signals; and
   the communication links comprise optical fibers configured to transport the optical signals.

6. The method of claim 1, wherein the communication link tethers the second node to the first node and provides power to the second node from the first node.

7. The method of claim 1, wherein:
   the first node comprises an anchor node positioned on the ground; and
   the second node comprises an aerial node positioned in the air.

8. An apparatus comprising:
   a first node comprising:

at least one transmitter configured to transmit a first electromagnetic signal to a second node through free space and to transmit a second electromagnetic signal to the second node through a communication link physically coupling the first and second nodes and having a known length; and at least one processing device configured to identify a distance between the first and second nodes based on (i) a time-difference-of-arrival between reception of the first electromagnetic signal at the second node and reception of the second electromagnetic signal at the second node and (ii) the known length of the communication link.

9. The apparatus of claim 8, wherein:

the at least one transmitter is configured to transmit the first electromagnetic signal from the first node to multiple second nodes through free space; and the at least one transmitter is configured to transmit the second electromagnetic signal from the first node to the second nodes through multiple communication links.

10. The apparatus of claim 9, wherein:

the at least one transmitter is further configured to transmit a third electromagnetic signal from the first node to the second nodes in order to cause at least some of the second nodes to transmit a fourth electromagnetic signal; and the at least one processing device is further configured to identify one or more distances between the second nodes based on time-differences-of-arrival between reception of the third and fourth electromagnetic signals at one or more of the second nodes.

11. The apparatus of claim 10, wherein at least one of:

the at least one transmitter is configured to transmit the first electromagnetic signal from the first node to all of the second nodes simultaneously through free space; and the at least one transmitter is configured to transmit the third electromagnetic signal from the first node to all of the second nodes simultaneously over the communication links.

12. The apparatus of claim 10, wherein:

the first and fourth signals comprise radio frequency (RF) signals;

the second and third signals comprise optical signals; and the communication links comprise optical fibers configured to transport the optical signals.

13. The apparatus of claim 8, wherein the communication link tethers the second node to the first node and is configured to provide power to the second node from the first node.

14. The apparatus of claim 8, wherein:

the first node comprises an anchor node positioned on the ground; and the second node comprises an aerial node positioned in the air.

15. A non-transitory computer readable medium containing instructions that when executed cause at least one processing device to:

obtain a time-difference-of-arrival identifying a time between receipt of a first electromagnetic signal transmitted from a first node to a second node through free space and receipt of a second electromagnetic signal transmitted from the first node to the second node through a communication link physically coupling the first and second nodes and having a known length; and identify a distance between the first and second nodes based on (i) the time-difference-of-arrival between reception of the first electromagnetic signal at the second node and reception of the second electromagnetic signal at the second node and (ii) the known length of the communication link.

16. The non-transitory computer readable medium of claim 15, wherein the instructions when executed cause the at least one processing device to:

obtain multiple time-differences-of-arrival each identifying a time between receipt of the first and second electromagnetic signals at one of multiple seconds nodes; and identify multiple distances between the first node and the multiple second nodes based on the time-differences-of-arrival.

17. The non-transitory computer readable medium of claim 16, wherein the instructions when executed cause the at least one processing device to:

obtain one or more additional time-differences-of-arrival each identifying a time between receipt of a third electromagnetic signal transmitted from the first node to the second nodes and receipt of a fourth electromagnetic signal transmitted from one of the second nodes in response to the third electromagnetic signal; and identify one or more distances between the second nodes based on the one or more additional time-differences-of-arrival.

18. The non-transitory computer readable medium of claim 17, wherein:

the first and fourth signals comprise radio frequency (RF) signals;

the second and third signals comprise optical signals; and the communication links comprise optical fibers configured to transport the optical signals.

19. The non-transitory computer readable medium of claim 15, wherein the instructions when executed cause the at least one processing device to:

identify a position of the second node with respect to the first node based on the identified distance.

20. The non-transitory computer readable medium of claim 19, wherein the instructions when executed cause the at least one processing device to:

identify positions of multiple second nodes with respect to the first node based on multiple identified distances, the identified distances including distances between the first node and the second nodes and distances between the second nodes.

* * * * *